Figure 1:
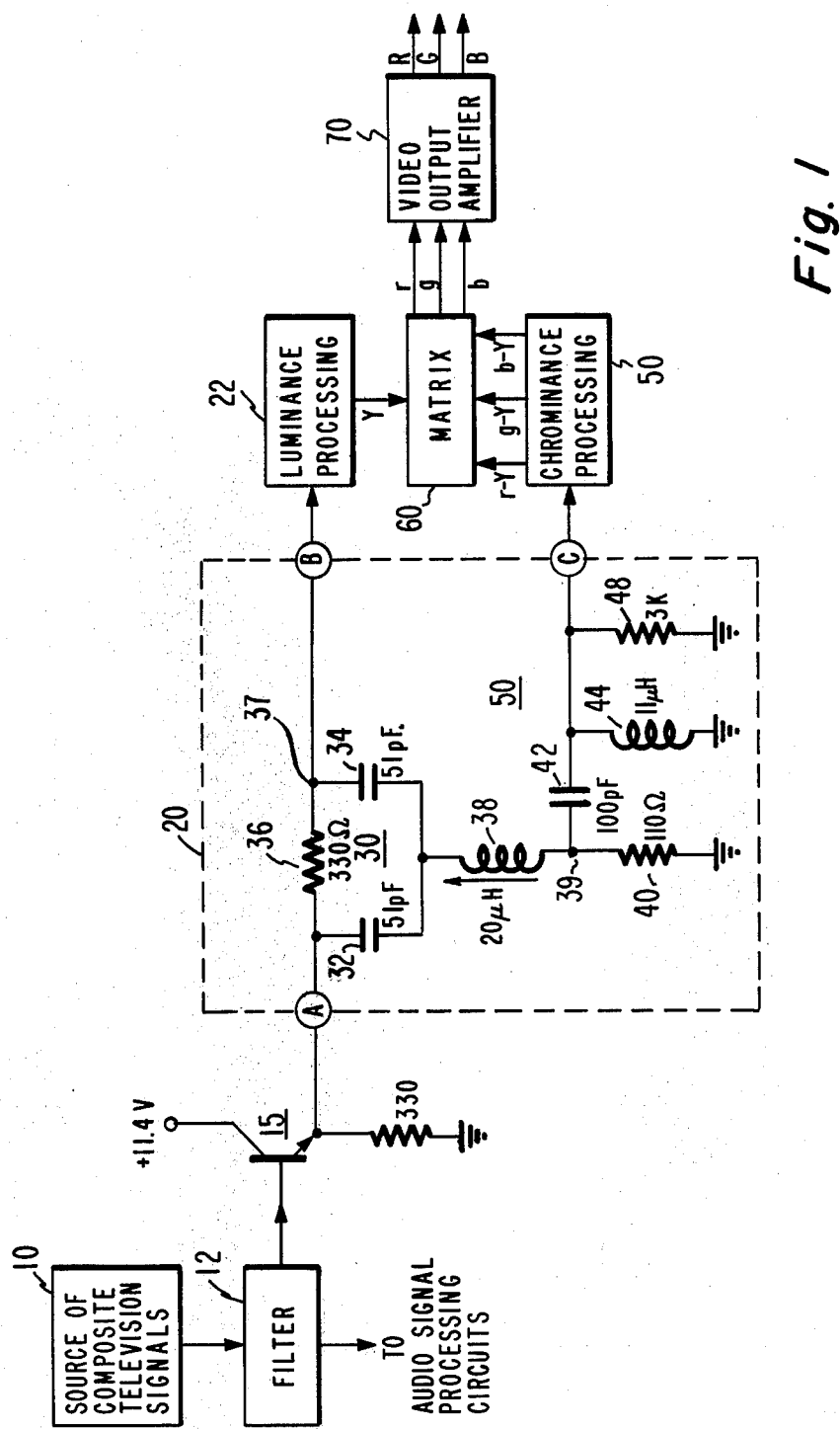

United States Patent [19]

Naimpally

[11] 4,288,811
[45] Sep. 8, 1981

[54] LUMINANCE AND CHROMINANCE SIGNAL SEPARATION NETWORK

[75] Inventor: Saiprasad V. Naimpally, Indianapolis, Ind.

[73] Assignee: RCA Corporation, New York, N.Y.

[21] Appl. No.: 135,926

[22] Filed: Mar. 31, 1980

[51] Int. Cl.³ .......................................... H04N 9/535
[52] U.S. Cl. ...................................................... 358/31
[58] Field of Search ............................. 358/31, 40, 39

[56] References Cited

U.S. PATENT DOCUMENTS

2,811,580  10/1957  Avins ..................................... 358/31

Primary Examiner—Richard Murray
Attorney, Agent, or Firm—Eugene M. Whitacre; William H. Meagher; Ronald H. Kurdyla

[57] ABSTRACT

A composite filter in a color television receiver includes a bridged-T network and a chrominance bandpass filter for mutually separating the luminance and chrominance components of a color television signal. In the bridged-T network, first and second signal paths are coupled between an input source of television signals and an output, the second path including a first reactance. A third signal path including a second reactance is coupled between an intermediate point in the second path and the input of the bandpass filter. The first and second reactances are tuned to the frequency of the color subcarrier signal of the chrominance component. A fourth, resistive signal path is coupled between the input of the bandpass filter and a reference potential. The four signal paths form a first filter for attenuating the chrominance component at the output of the bridged-T network to provide a separated luminance component at the output of the bridged-T network. The bridged-T filter and the bandpass filter cooperate to produce a double-tuned chrominance passband response for selectively passing signal frequencies of the chrominance component to yield a separated chrominance component at the output of the bandpass filter.

10 Claims, 10 Drawing Figures

LUMINANCE AND CHROMINANCE SIGNAL SEPARATION NETWORK

This invention concerns an electrical circuit for separating the luminance and chrominance signal components contained in a composite color television signal.

Conventional color television receivers include circuits of various forms for separating the luminance and chrominance information components of a color television receiver before these components are processed by other circuits in the receiver, after which these components are recombined to produce red, green and blue color image representative signals.

Some receivers employ a comb filter circuit to separate the frequency interleaved luminance and chrominance components, as disclosed in U.S. Pat. No. 4,096,516, for example. Other receivers employ separate filter circuits which operate independently on the composite television signal to derive the luminance and chrominance components of a form suitable for processing by circuits within luminance and chrominance channels of the receiver.

These known types of filter circuits can suffer from one or more disadvantages related to cost, complexity, and reliability of performance when a large number of circuit components is required. In accordance with the principles of the present invention, there is disclosed herein an economical, uncomplicated, easily aligned circuit for providing mutually separated luminance and chrominance components of a form suitable for processing by luminance and chrominance signal processing circuits in the receiver.

A filter circuit according to the present invention is incorporated in a color television receiver including a source of composite video signals containing a luminance component and a chrominance component including a modulated color subcarrier. The receiver also includes luminance and chrominance signal processing channels. A first signal path is coupled between the source of video signals and an input of the luminance channel. A second signal path is coupled in parallel with the first path, and includes a first reactive impedance. A third signal path is coupled between an intermediate point in the second path and a circuit point. The third path includes a second reactive impedance tuned with a first reactive impedance to the frequeny of the color subcarrier. A fourth signal path is coupled between the circuit point and a reference potential. The first, second, third and fourth signal paths comprise a first filter for attenuating the chrominance component at the input of the luminance channel. A second filter with an input coupled to the circuit point and an output coupled to the chrominance channel is also included. The second filter comprises a bandpass filter cooperating with the filter to selectively pass to the chrominance channel signal frequencies within a range of frequencies occupied by the chrominance component.

In accordance with a feature of the invention, the fourth signal path comprises a resistor.

In accordance with a further feature of the invention, the bandpass filter comprises a single-tuned filter tuned to a frequency within the range of frequencies occupied by the chrominance component different from the frequency of the color subcarrier.

Figure 3:
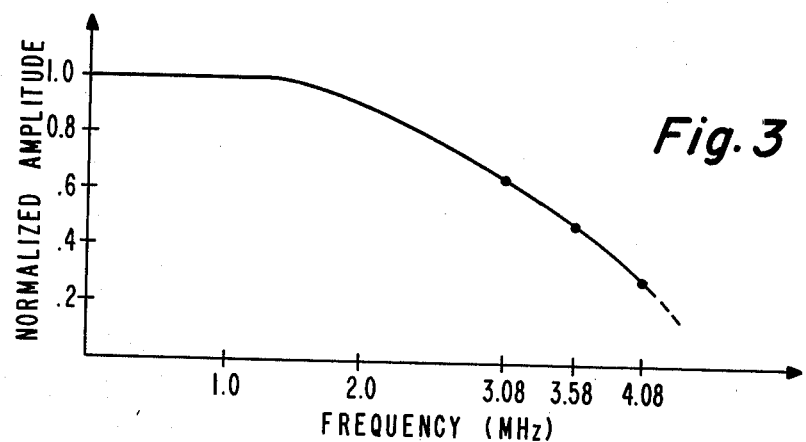
Figure 4A:
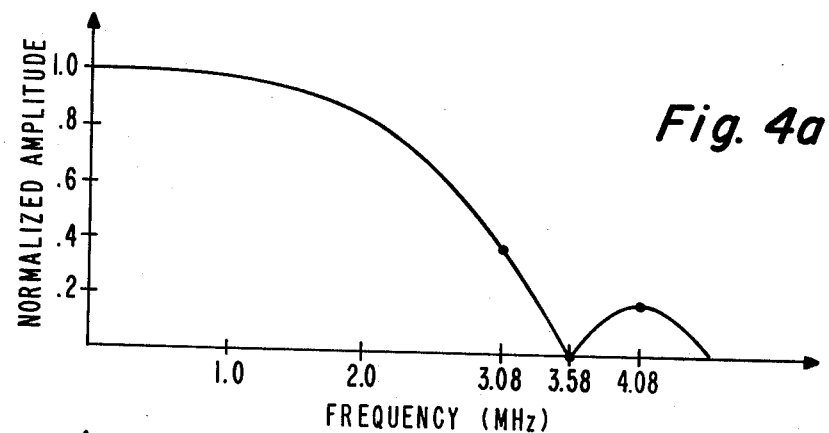
Figure 4B:
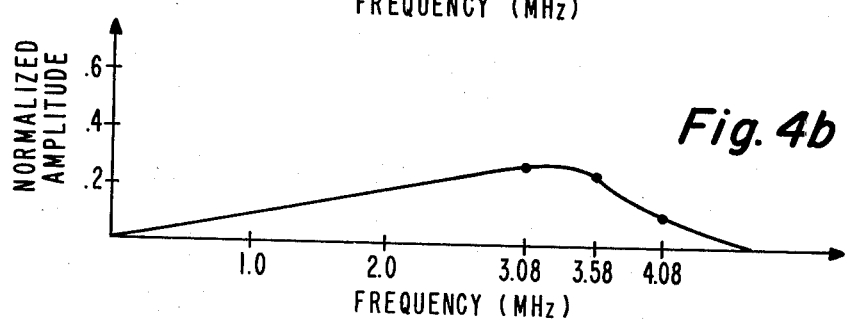
Figure 4C:
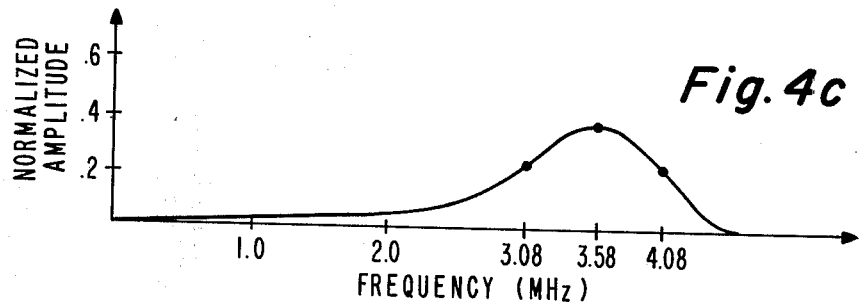
Figures 5A, 5B:
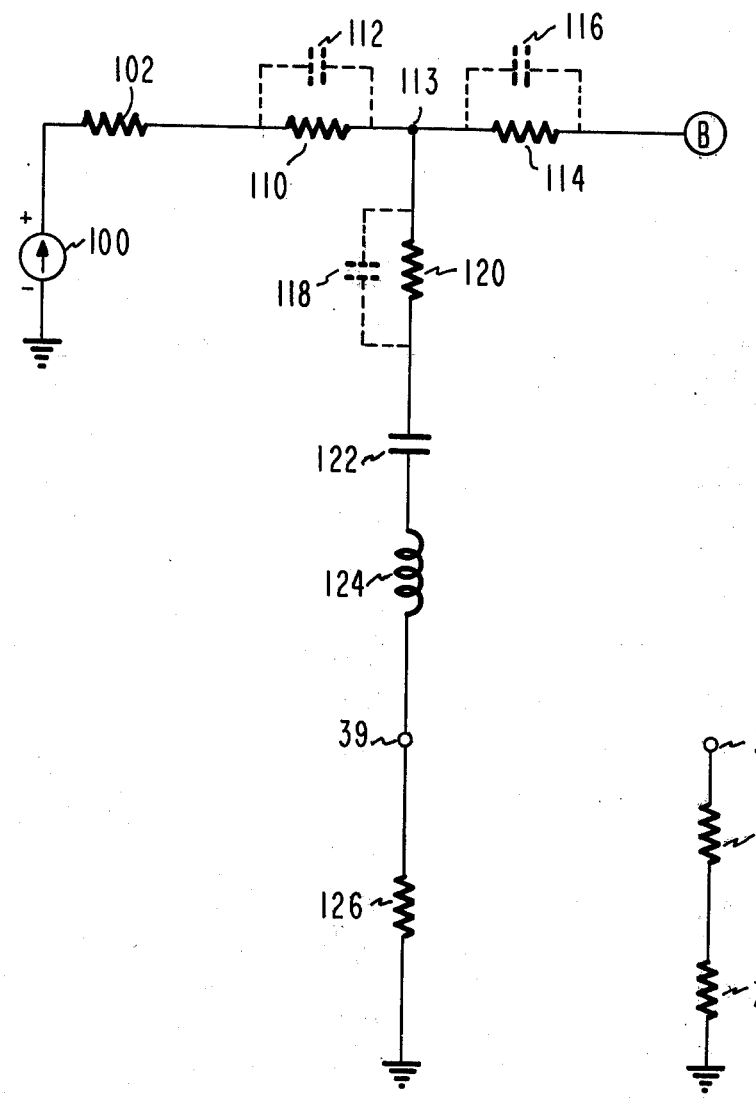

In the drawing:

FIG. 1 illustrates, partly in block diagram form and partly in schematic circuit diagram form, an arrangement including a signal separation network constructed in accordance with the principles of the present invention;

FIGS. 2a-2c, 3, and 4a-4c illustrate amplitude versus frequency response waveforms associated with the arrangement of FIG. 1; and FIGS. 5a and 5b illustrate equivalent circuits of a portion of the signal separation network of FIG. 1.

In FIG. 1, a source of composite color television signals 10 (e.g., including RF and IF signal amplifier and signal detection stages) provides a composite detected output signal comprising luminance, chrominance and audio components. According to United States television broadcast standards, the luminance component has a relatively wide bandwidth extending from D.C. or zero Hertz to approximately four megahertz. The upper frequency range of the luminance component is shared with the chrominance component, which comprises a subcarrier signal of approximately 3.58 megahertz amplitude and phase modulated with color information. The audio component of the composite detected signal is removed by means of a filter 12, and is afterwards applied from one output of filter 12 to audio signal processing circuits of the receiver (not shown). Filter 12 can be of the bridged-T type as described in my copending U.S. patent application Ser. No. 085,312, entitled, "Signal Separation Networks."

The remainder of the composite television signal, containing the luminance and chrominance components, appears at another output of filter 12 and is buffered by a transistor 15 prior to being applied to an input terminal A of a signal separating composite filter network 20. As will be discussed in detail subsequently, the luminance component of the television signal appears at an output terminal B of network 20, substantially exclusive of the chrominance component. The chrominance component appears at an output terminal C of network 20, substantially exclusive of the luminance component.

The luminance component from terminal B is subjected to further processing by a luminance processing network 22 (e.g., including amplifier, filter and clamping stages) to develop a processed luminance output signal Y. The chrominance component from terminal C is processed by a network 50 to develop r-Y, g-Y and b-Y color difference signals in a known manner. These signals are combined with luminance signal Y in a matrix 60 for developing r, g and b color signals which are then amplified by video amplifier 70 to produce high level R, G, B color image signals suitable for application to intensity control electrodes of a color kinescope (not shown).

Referring now specifically to network 20, the composite television signal is coupled via input terminal A to a bridged-T network 30 within network 20.

In general, one form of a bridged-T network is characterized by a parallel resonant circuit in series with the video signal path, and an impedance in shunt with the video signal path. The shunt impedance is used to balance the parallel resonant circuit, so as to effect maximum cancellation at a given frequency. In a second form of the network, a parallel R-C circuit in series with the video signal path is tuned and balanced by reactive and resistive impedances in the shunt leg. In both forms, the network is known as a cancellation-type network, since signals at the tuned frequency at the output junction of the two parallel circuit paths are in antiphase relationship and hence trapped out of the video signal path. An example of the use of a bridged-T network of the first form for video signal processing is shown in U.S. Pat. No. 2,811,580, issued to Jack Avins.

Bridged-T network 30 acts to remove the chrominance component from the luminance signal that appears at a point 37 and at output terminal B. Bridged-T network 30 includes a bridging resistor 36 and serially coupled capacitors 32 and 34, which are coupled in parallel with the signal path between input terminal A and luminance output terminal B. The series combination of an adjustable inductor 38 and a resistor 40 is coupled between the junction of capacitors 32 and 34 and a point of reference potential (ground).

The chrominance signal is developed by bridged-T network 30 in peaked form at the junction 39 of inductor 38 and resistor 40. This signal is then supplied as an input to a single-tuned chrominance bandpass filter circuit 50 comprising a capacitor 42, an inductor 44 and a resistor 48. This circuit provides additional filtering of signals developed at junction 39 so as to develop an appropriately separated chrominance signal at output terminal C.

Figure 2A:
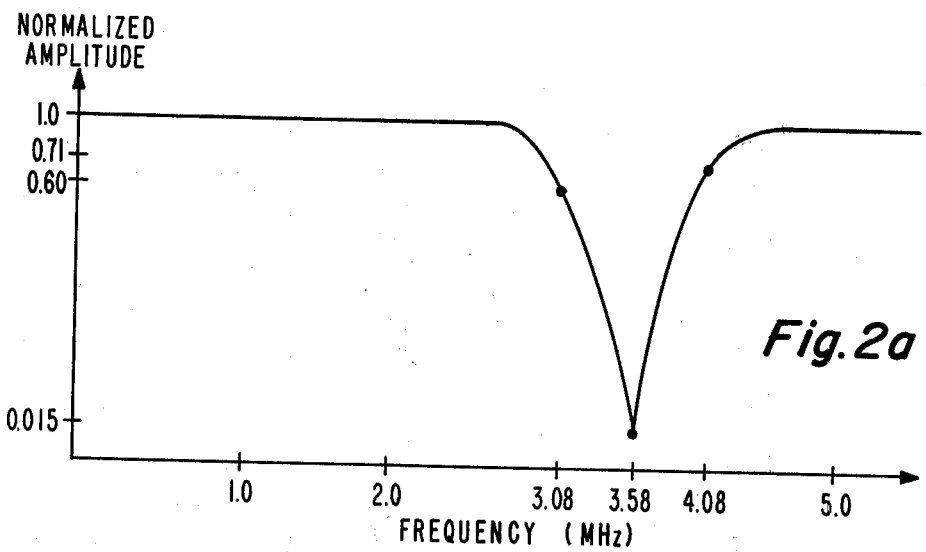
Figure 2B:
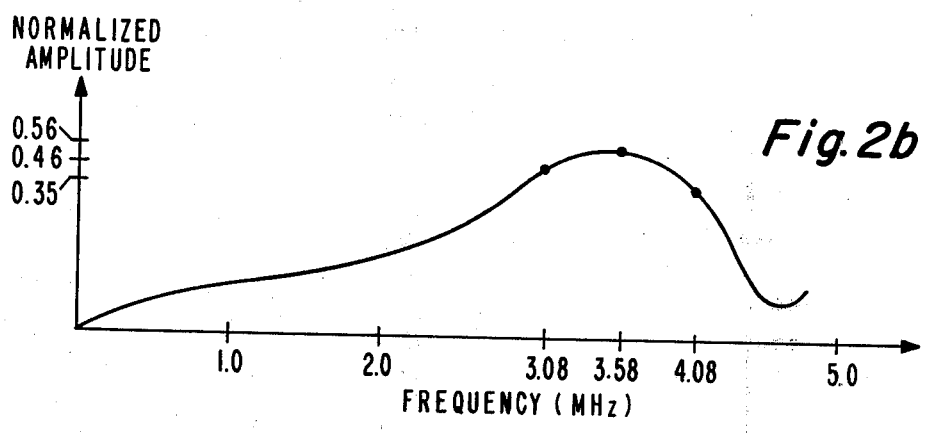
Figure 2C:
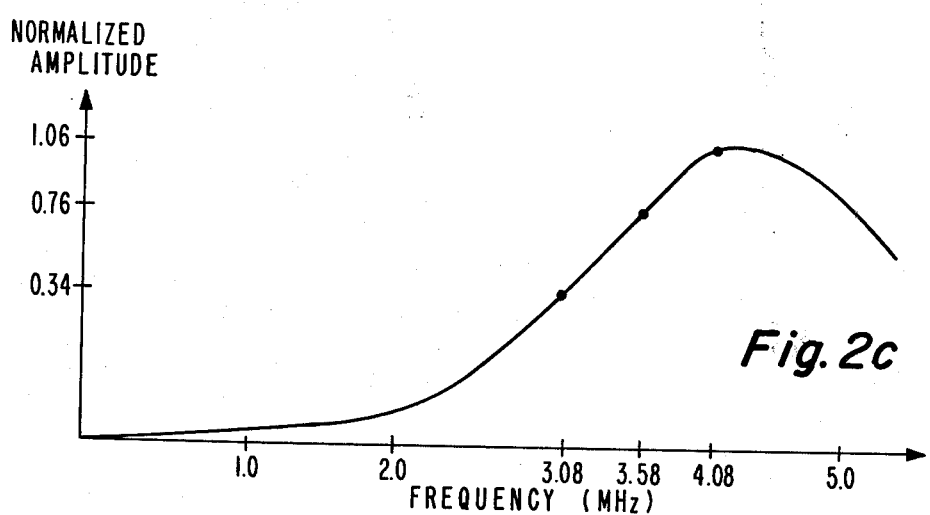

FIGS. 2a–2c illustrate responses of network 20 when considered apart from the overall system of FIG. 1.

Bridged-T network 30 is tuned to the chrominance subcarrier frequency (3.58 MHz) by adjusting inductor 38, and exhibits a chrominance trapping (null) response at terminal B and a chrominance peaking response at junction 39 and terminal C. The waveform of FIG. 2a illustrates the response of network 20 produced at output terminal B, with maximum attenuation occurring at the chrominance subcarrier frequency. The waveform of FIG. 2b shows the response of the bridged-T network with respect to signals developed at junction 39, where maximum peaking occurs in the vicinity of the chrominance subcarrier frequency. The waveform of FIG. 2c shows the response of the bridged-T network together with bandpass filter 50 with respect to output signals developed at terminal C. Filter 50 is tuned to a frequency above 3.58 MHz so that maximum peaking occurs at a frequency (approximately 4.08 MHz) greater than the 3.58 MHz chrominance subcarrier frequency. The response of FIG. 2c is necessary in this example to compensate for the slope of the bandpass characteristic of intermediate frequency signal processing circuits included in source 10. Typically, this bandpass characteristic ultimately results in attenuation of signal frequencies within the 3.08 MHz–4.08 MHz chrominance passband, as shown by the response of FIG. 3. More specifically, source 10 includes RF and IF amplifier stages, and a video detector for detecting video information contained in the IF signal. The IF stage exhibits a bandpass response including the picture carrier at an IF frequency of 45.75 MHz and the color subcarrier at an IF frequency of 42.17 MHz. In pertinent part, the video detector translates the IF signal to derive a composite video signal inclusive of a chrominance component comprising sidebands of a 3.58 MHz color subcarrier. Increasing attenuation with increase in frequency for chrominance component frequencies in the 3.08 MHz to 4.08 MHz band results (as shown in FIG. 3) due to the slope of the IF bandpass response in the vicinity of the 42.17 MHz IF frequency.

In a practical system of the type shown in FIG. 1, attenuation in the vicinity of the chrominance passband between 3.08 MHz and 4.08 MHz (FIG. 3) as produced by the IF signal processing circuits should be compensated for in order to achieve a desired amplitude response for chrominance signals that are to be applied to chrominance signal processing circuits such as are indicated by unit 50 in FIG. 1. Network 20 in the system of FIG. 1 is arranged to provide such compensation and attendant desired chrominance passband response at output terminal C, as shown in FIG. 4c.

The responses shown in FIGS. 4a–4c correspond to the response of network 20 when the system including source 10 and network 20 is considered as a whole. In this case, FIG. 4a illustrates the response produced at luminance output terminal B, with a null occurring at the 3.58 MHz chrominance subcarrier frequency. The response with respect to signals developed at point 39 is shown in FIG. 4b, and the response produced at chrominance output terminal C is shown in FIG. 4c. The response shown by FIG. 4c provides a separated chrominance component appropriate for processing by chrominance processor 50 (FIG. 1). Note that this response exhibits good chrominance selectivity with a substantially symmetrical bandpass characteristic with respect to the chrominance subcarrier signal frequency, and significant rejection of luminance signal frequencies.

Neglecting bandpass filter 50 for the moment, the operation of bridged-T network 30 in FIG. 1 may be understood by referring to the bridged-T equivalent circuit shown in FIG. 5a. The network is driven by an idealized voltage source 100 and a series impedance 102. Resistances 110 and 114 are coupled in series with the video signal path, and each resistance is in parallel with one of capacitances 112 and 116, respectively. The series combination of resistance 120, capacitance 122, inductance 124, and resistance 126 is coupled between the junction 113 of resistances 110, 114 and ground. A capacitance 118 is coupled in parallel with resistance 120.

Resistances 110, 114 and 120 have values which are a function of the value of the bridging resistor 36 in FIG. 1. Resistances 110 and 114 are each half the resistance of resistor 36, and resistance 120 has a negative resistance of one-fourth of the value of resistor 36. Capacitances 112, 116 and 118 have values which are related to the values of capacitors 32 and 34 of FIG. 1. These capacitances are drawn in broken lines because they are each shunted by relatively much smaller impedances. For purposes of this example, these broken line capacitances may be neglected.

Capacitor 122 has a value which is equal to the sum of the values of capacitors 32 and 34 in FIG. 1. Inductance 124 represents the inductance of inductor 38, and resistor 126 represents the effective value of resistor 40 plus the coil losses of inductor 38.

When the bridged-T network is properly tuned, capacitance 122 and inductance 124 present virtually a zero impedance to signals at the chrominance subcarrier frequency. The impedance of the series path between junction 113 and ground is then determined by the effect of resistors 120 and 126. When the value of resistance 126 is chosen to be equal to the negative resistance of resistance 120, the two resistances cancel each other, and a virtual short circuit is presented by the series path to chrominance signals at junction 113. By selecting component values in this manner, the bridged-T network trap response at terminal 37 of FIG. 1 will have virtually an infinite Q at the chrominance subcarrier frequency, resulting in very high attenuation of the chrominance signal at output terminal B. Thus, it is seen that the network 30 of FIG. 1 is properly proportioned when the effective value of resistance between point 39 and ground, plus the coil losses of inductor 38, is equal to one-fourth the value of the bridging resistor 36.

The foregoing analysis of the bridged-T network is modifed when, as shown in FIG. 1, bandpass filter 50 is coupled to junction point 39 and shunts resistor 40. The effective value of impedance then developed in the shunt leg of bridged-T network 30, including capacitors 32, 34, inductor 38 and resistor 40, is a function of the value of resistor 40 in combination with the input impedance of bandpass filter 50.

The input impedance of filter 50 is complex in form and includes a resistive component $R_F$ and a reactive component $X_F$. The portion of the equivalent circuit of FIG. 5a between point 39 and ground is then modified as shown by FIG. 5b. The impedance then presented between point 39 and ground comprises the series combination of a resistive impedance $Z_R$ and reactive impedance $Z_X$, the values of $Z_R$ and $Z_X$ being algebraic functions of $R_F$, $X_F$ and resistor 126. Inductance 124 is tuned such that the total impedance presented by capacitance 122, inductance 124 and reactance $Z_X$ is virtually zero in response to signals at the chrominance subcarrier frequency. Also, the value of resistor 126 is chosen so that the resulting resistive impedance $Z_R$ is equal in value to (negative) resistance 120. With reference to the circuit of FIG. 1 including network 30 and filter 50, the optimum value of bridging resistor 36 equals four times the sum of the coil losses of inductor 38 plus the effective resistance in the path between point 39 and ground.

The described arrangement of network 20 in FIG. 1 represents an attactive approach to providing appropriately separated luminance and chrominance components, in addition to being economical and uncomplicated.

The chrominance signals appear at point 39 with a sufficiently high amplitude and at an impedance consistent with the input requirements of bandpass filter 50. The input impedance of chrominance bandpass filter 50, comprising resistive and reactive components, is coupled to the relatively low resistive impedance presented by resistor 40, which does not exhibit a complex impedance characteristic. This avoids degradation of the Q network 20 with respect to the chrominance trapping and peaking functions, whereby effective nulling of the chrominance component is produced at luminance output terminal B and effective peaking of the chrominance component is produced at chrominance output terminal C.

The described operation of the bridged-T network advantageously permits the use of a relatively simple single-tuned chrominance bandpass filter 50 to produce a double-tuned chrominance peaking response (FIG. 4c) at terminal C, with good chrominance selectivity including a desired symmetrical amplitude response between 3.08 MHz and 4.08 MHz, and significant rejection of luminance signal frequencies.

The described bridged-T network also exhibits compensation for the coil losses of inductor 38, thereby producing greater attenuation of chrominance signals (i.e., a deeper notch in the waveforms of FIGS. 2a and 4a) at terminal B than would otherwise be evident if the coil losses were uncompensated. This results since the value of the negative resistance (shown as element 120 in FIG. 5a) cancels with the sum of the coil losses of inductor 38 plus the resistance developed between point 39 and ground.

What is claimed is:

1. In a color television receiver including a source of composite video signals containing a luminance component and a chrominance component including modulated color subcarrier, a luminance signal processing channel, and a chrominance signal processing channel, a filter circuit for separating said luminance and chrominance components comprising:
    a bridged-T filter network for attenuating said chrominance component at said input of said luminance channel, including
    a first signal path coupled between said source of video signals and an input of said luminance channel, said first path including a first reactive impedance;
    a second signal path coupled between an intermediate point in said first signal path and a point of reference potential, said second path including a second reactive impedance tuned with said first reactive impedance to the frequency of said color subcarrier and a signal tap between said second reactive impedance and said point of reference potential; and
    a bandpass filter with an input coupled to said signal tap and an output coupled to said chrominance channel, said bandpass filter cooperating with said bridged-T filter to selectively pass to said chrominance channel signal frequencies within a range of frequencies occupied by said chrominance component.

2. A circuit according to claim 1, wherein:
    said second path includes a resistive impedance coupled between said second reactive impedance and said point of reference potential;
    said input of said bandpass filter is coupled between said second reactive impedance and said resistive impedance; and
    said bandpass filter is tuned to a frequency within the range of frequencies occupied by said chrominance component different from the frequency of said color subcarrier.

3. In a color television receiver including a source of composite video signals containing a luminance component and a chrominance component including a modulated color subcarrier, a luminance signal processing channel, and a chrominance signal processing channel, a filter circuit for separating said luminance and chrominance components comprising:
    a first signal path coupled between said source of video signals and an input of said luminance channel;
    a second signal path coupled in parallel with said first signal path and including a first reactive impedance;
    a third signal path coupled between an intermediate point in said second signal path and a circuit point, said third path including a second reactive impedance tuned with said first reactive impedance to the frequency of said color subcarrier;
    a fourth signal path coupled between said circuit point and a point of reference potential, wherein said first, second, third, and fourth signal paths comprise a first filter for attenuating said chrominance component at said input of said luminance channel; and
    a second filter with an input coupled to said circuit point and an output coupled to said chrominance channel, said second filter comprising a bandpass filter cooperating with said first filter to selectively pass to said chrominance channel signal frequencies within a range of frequencies occupied by said chrominance component.

4. A circuit according to claim 3, wherein:
said first signal path includes a resistive impedance having a resistance substantially equal to four times the resistive impedance presented between said intermediate point in said second path and said point of reference potential by said third and fourth signal paths.

5. A circuit according to claim 4, wherein:
said fourth signal path comprises a resistor; and
said second reactive impedance of said third path and said resistor of said fourth path are serially coupled in that order between said intermediate point in said second signal path and said point of reference potential.

6. A circuit according to claim 5, wherein:
said first reactive impedance comprises a capacitively reactive impedance; and
said second reactive impedance comprises an inductively reactive impedance.

7. A circuit according to claims 3, 4, 5 or 6 wherein:
said bandpass filter is tuned to a frequency within the range of frequencies occupied by said chrominance component different from the frequency of said color subcarrier.

8. A circuit according to claim 7, wherein:
said bandpass filter comprises a single-tuned filter circuit.

9. A circuit according to claim 7, wherein:
said source of composite video signals includes intermediate frequency signal processing means having a bandpass characteristic wherein signals within the range of frequencies occupied by said chrominance component are subject to attenuation; and
said bandpass filter comprises a single-tuned circuit tuned to a frequency greater than said color subcarrier frequency.

10. A circuit according to claim 7, wherein:
said bandpass filter comprises a series resonant filter circuit.

* * * * *